June 2, 1936. C. E. FISHER 2,043,039
HYDRAULIC BRAKE
Filed May 23, 1935 4 Sheets-Sheet 2
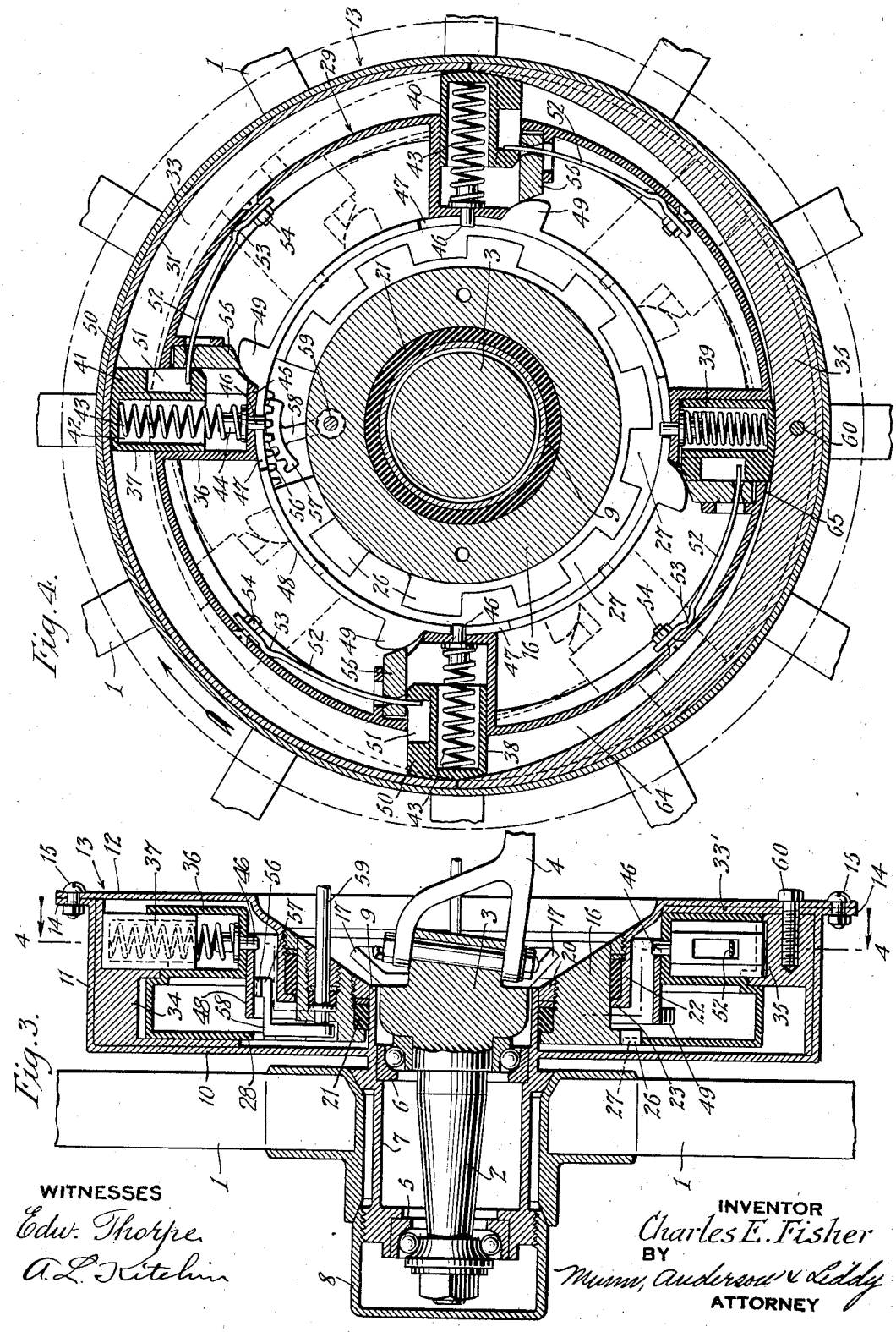
WITNESSES
Edw. Thorpe
A. L. Kitchin
INVENTOR
Charles E. Fisher
BY
Munn, Anderson & Liddy
ATTORNEY June 2, 1936.     C. E. FISHER     2,043,039
HYDRAULIC BRAKE
Filed May 23, 1935     4 Sheets-Sheet 3
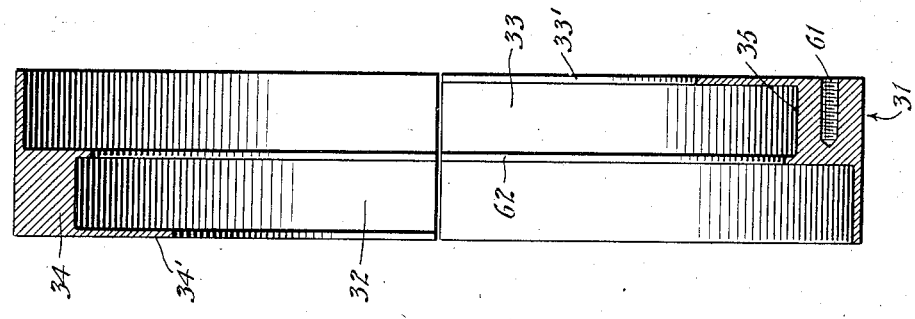
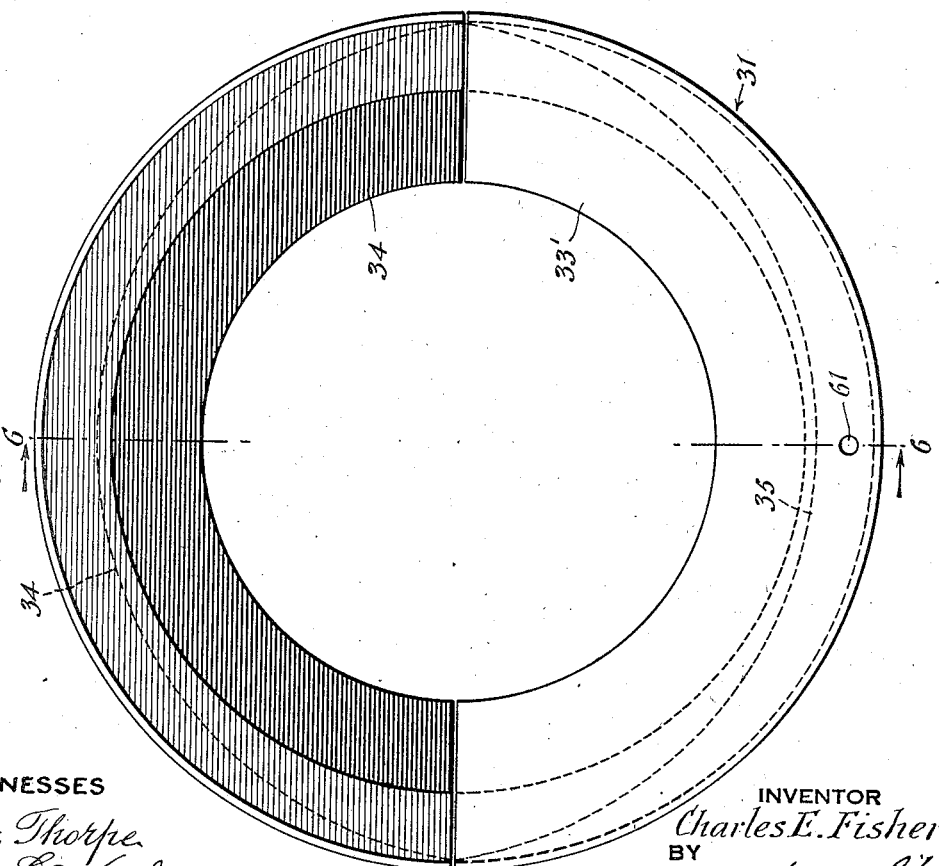

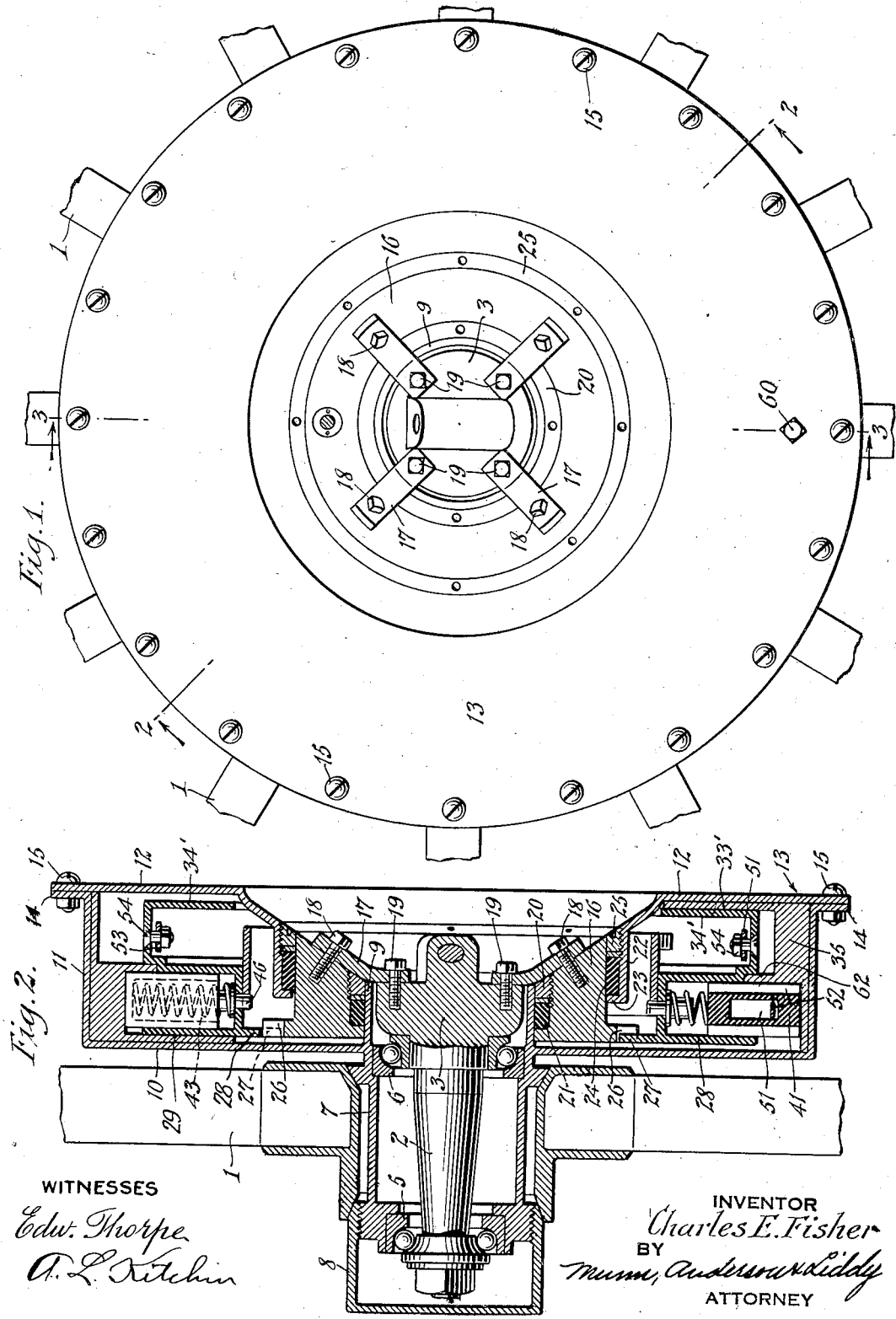

June 2, 1936.                C. E. FISHER                2,043,039
                            HYDRAULIC BRAKE
                    Filed May 23, 1935        4 Sheets-Sheet 4
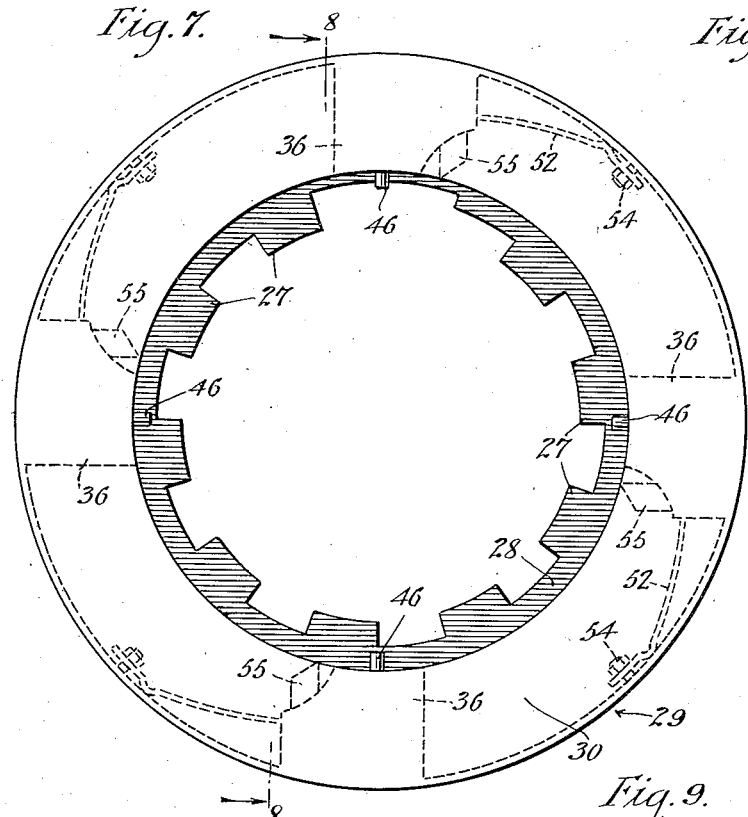
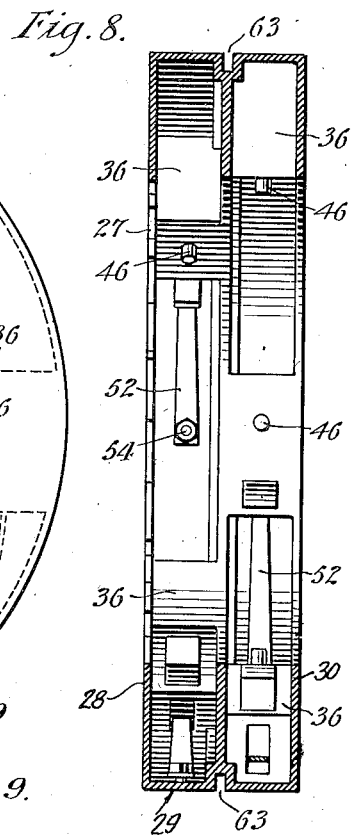
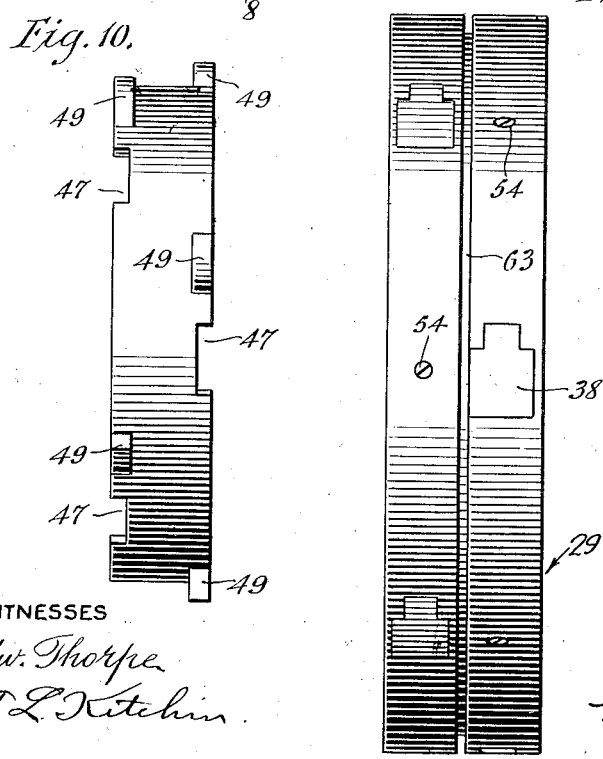
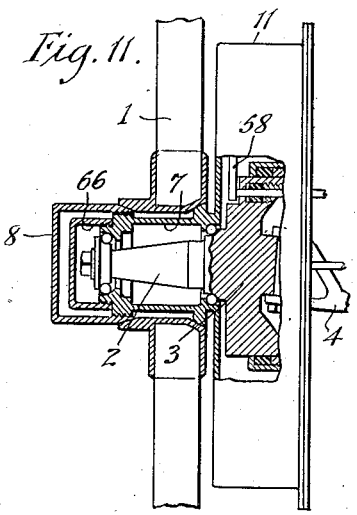
WITNESSES
Edw. Thorpe
A. L. Kitchin
INVENTOR
Charles E. Fisher
BY
Munn, Anderson & Liddy
ATTORNEY Patented June 2, 1936

2,043,039

UNITED STATES PATENT OFFICE 2,043,039

HYDRAULIC BRAKE

Charles E. Fisher, Peekskill, N. Y.

Application May 23, 1935, Serial No. 23,094

6 Claims. (Cl. 188—90)

This invention relates to hydraulic brakes, and has for an object to provide an improved construction which may be used on automobiles and other vehicles for checking and stopping the rotation of the wheels thereof with a minimum of effort and a minimum of strain on the mechanism.

Another object of the invention is to provide a hydraulic brake for vehicles and the like, whereby in a form of rotary pump construction is used to secure a retarding and braking action.

A further object of the invention is to provide in a hydraulic brake, rotary and stationary elements, with the parts so formed that upon foot or hand actuation they will react and utilize a fluid as a friction means for retarding or stopping the rotation of a wheel, the retarding action being proportionate to the movement of the actuating mechanism.

A further object, more specifically, is to provide a hydraulic brake with a movable structure having one or more rotating abutments acting with the piston and piston blades for producing a retarding action of the rotating element through the use of a fluid reacting with the blades and abutment.

In the accompanying drawings—

Figure 1 is a side view of a brake embodying the invention and part of a wheel to which it is attached;

Fig. 2 is a sectional view through Fig. 1 approximately on the line 2—2;

Fig. 3 is a sectional view through Fig. 1 approximately on the line 3—3;

Fig. 4 is a sectional view through Fig. 3 approximately on the line 4—4;

Fig. 5 is a side view of a rotating drum disclosing certain features of the invention;

Fig. 6 is a sectional view through Fig. 5 on the line 6—6;

Fig. 7 is a side view of a stationary piston embodying certain features of the invention;

Fig. 8 is a sectional view through Fig. 7 approximately on the line 8—8;

Fig. 9 is an edge view of the piston shown in Fig. 7;

Fig. 10 is an edge view of a control ring embodying certain features of the invention;

Fig. 11 is a view somewhat similar to Fig. 3 but shown particularly in elevation and illustrating a modified form of the invention.

Referring to the accompanying drawings by numerals, 1 indicates a wheel, which may be of any desired kind, that shown in the drawings being the front wheel of an automobile, the same being mounted on an axle 2 in the usual manner, the axle being provided with an enlargement 3. The enlargement 3 is connected in the usual manner with a knuckle 4. It will be understood that the knuckle 4 and axle 2 are of the usual construction now in common use except for the enlargement 3. However, the bearing structures 5 and 6 are mounted in the wheel hub 7 which is clamped to the wheel 1 by a suitable cap nut 8. The wheel hub 7 is preferably provided with an integral tubular extension 9 having a radiating flange 10 which with the associated parts forms a casing. The casing comprising the flange, tubular extension 11, and inner plate 12, forms what may be termed the casing 13. The plate 12 is secured in position to a radiating flange 14 of the tubular extension 11 by suitable bolts 15. In this way it will be seen that the casing 13 being practically integral with the wheel hub 7, rotates with the wheel hub and with the wheel 1. It will be understood that other forms of connection to the wheel 1 may be used without departing from the spirit of the invention, but it is desirable to have the flange 10 and also the tubular extension 9.

As just mentioned, the casing 13 rotates with the wheel while interiorly thereof there is positioned an auxiliary stationary hub 16 secured to the enlargement 3 by any suitable means, as, for instance, a number of bars 17 (Fig. 2), which are secured respectively to the auxiliary hub 16 and enlargement 3 by screws 18 and 19. A packing ring 20 is screwed into the auxiliary stationary hub 16, as shown in Figs. 2 and 3, so as to compress the packing 21 to make an oil-tight fit between the hub 16 and the tubular extension 9. Also as shown in Fig. 2, the plate 12 is provided with an inwardly extending member 22 having an internal flange 23, whereby the packing 24 is accommodated, and also the clamping screw 25 may be screwed into the threaded portion of the member 22, so as to provide an oil-tight sliding connection between the plate 12 and the periphery of the stationary hub 16. The stationary hub 16 is also provided with a number of comparatively large teeth 26, which accommodate the teeth 27 on the outer flange 28 of the stationary piston 29. The inner flange 30 of piston 29 is uniform in shape, as illustrated in Figs. 7 and 8.

When the parts are assembled, the auxiliary stationary hub 16 is mounted in place as shown, for instance, in Fig. 2, and then the piston 29 is slid into its correct position with the teeth 27 thereof properly sliding between the teeth 26 of the hub 16. This provides a connection between the piston 29 and the hub 16 while allowing an adjustment of the hub 16 when the bearings of the wheel have been adjusted. The movement of the respective parts in this adjustment is slight, and, consequently, the thickness of the teeth 26 permits a ready adjustment and yet maintains an interengagemet with the teeth 27.

As illustrated in Fig. 4, the piston 29 has the periphery thereof concentric with the center of the enlargement 3 and coacts with the rotary drum 31 to produce axially disposed outer and inner chambers 32 and 33. As these chambers are identical a description of one with the associated parts will apply to the other. The only distinction is that the respective abutments 34 and 35 are on diametrically opposite sides. It will be understood that the brake could function with only one of these chambers and one set of cooperating parts, though two or even more are desirable as it balances the action and produces a more uniform braking action. As illustrated in Fig. 4, the piston 29 is provided with four blade housings 36, though more or even less could be used without departing from the spirit of the invention. These blade housings accommodate the respective blades 37, 38, 39, and 40. As all the blades and blade housings are identical in structure, a description of one will apply to all. The blade 37, for instance, is provided with a rounded surface 41, whereby it may readily engage and slide along the inner surface of the drum 31. Also blade 37 is provided with a bore 42 accommodating a spring 43, which spring at one end surrounds a centering pin 44 and reacts against the end 45 of housing 36. The pin 44 has an extension 46 which projects through the end 45 and into a notch 47 in a control ring 48. The control ring, as shown in Figs. 4 and 10, has a notch 47 for each of the housings 36 and also a cam 49 for each of the housings. In addition, the blade 37 is provided with an extension 50 having a notch 51 into which the end of a spring 52 extends. This spring is provided with an offset portion 53 acting as a fulcrum and secured to the peripheral part of the piston 29 by a suitable bolt 54. The spring 52 continually acts to move the blade 37 inwardly and whenever permitted to do so will maintain the blade in its inner position so that its outer surface 41 will be substantially flush with the outer surface of the piston 29. In order to do this the spring 52 is sufficiently strong to overcome the action of spring 43 but cannot overcome the action of the cams 49. The cams 49 when moved to the position shown in Fig. 4 will engage and press the sliding blocks 55 outwardly, as shown in Fig. 4, so as to swing the ends of springs 52 disposed in the notches 51 of blocks 55 outwardly, thus permitting the spring 43 to move the piston 29 to its outward position. If cam 49 were moved clockwise, in Fig. 4, for a short distance, spring 52 would move block 55 radially inwardly and also the blade 37 radially inwardly a corresponding distance as this spring is sufficiently strong to overcome spring 43. Therefore, the position of the blade 37, and, in fact, all of the blades are determined by the position of the respective cams 49.

A short rack 56 is formed on the inner surface of the ring 48, and the ring 48 and the flange 28 of piston 29 are cut away to accommodate this rack and a segmental gear 57 which is secured to an arm 58 which in turn is rigidly secured to a rock shaft 59. This rock shaft 59 extends to a point exterior of the brake mechanism, as shown in Fig. 3, and may be connected to a foot pedal or other actuating means in any desired manner, for instance, to the usual foot pedal of an automobile, and when it is desired to apply the brakes, the operator merely pushes down on the brake pedal to any desired extent and this will partly rotate the shaft 59. If the brake pedal is pushed down for its full stroke, shaft 59 will be rocked for its full stroke and the control ring 48 will be moved over to its full distance as shown in Fig. 4, whereupon the brake mechanism is functioned to its fullest extent. If the brake pedal is moved down only half its travel all the parts will be correspondingly moved and the blade 37 will be moved outwardly only half of its full travel so that the braking action will be much less.

It will be understood that the chamber 33 is to be maintained half full or more with oil or other liquid. Under some circumstances the chamber is completely filled while under others it is two-thirds filled, or approximately half filled. The respective blades 37 function in the respective chambers 32 and 33, which chambers, as above mentioned, are either filled or partly filled with oil.

During the operation of the automobile, the rotating elements, namely, casing 13 and drum 31 will rotate with the wheel, while the remaining parts will remain stationary or will be moved according to the action of the brake pedal.

From Fig. 3 it will be seen that there is provided a screw 60 which extends through the plate 12 and into a threaded aperture 61 in the abutment 35. The drum 31 is formed in two parts merely in order that it may be placed in position so that the central flange 62 may fit into a groove 63 in the stationary piston 29. Screw 60 acts to firmly connect the rotary drum 31 with the casing 13 so that these two parts will rotate in unison. Also it will be noted, particularly from Fig. 6, that the chamber 33 has a flange 33' for half of its circumference while chamber 32' has a flange 34' for half of its circumference, said flanges being on diametrically opposite sides of the drum. As shown in Fig. 3, the screw 60 extends through the flange 33' as well as through the plate 12. From Fig. 4 it will be seen that the casing 13 is cylindrical and that the bores of the respective chambers 32 and 33 do not present a true circle but that one half presents a true arc struck from the center of the enlargement 3 while the other half is a true arc offset from the center of enlargement 3 so as to form the abutment 35. The other chamber is formed in a like manner except that the abutment is on the diametrically opposite side.

In operation after the automobile has been started and it is desired to check the rotation of the wheel or to stop said rotation, the usual brake pedal of the automobile is actuated and movement will be transmitted to the control ring 48 for shifting the same to the position shown in Fig. 4 or to any intermediate position. As the rotating elements continue to rotate in the direction of the arrow, Fig. 4, the movement of the abutment will push the liquid in the space 64 toward the blade 38 which if held completely in its outer position will produce a very strong braking action but if only partly out it will produce a braking action but to a less extent as the oil may readily escape by the blade. When all the blades are in the innermost position the abutment 35 and also the abutment 34 will rotate but will produce no braking action as preferably there is always provided a small space indicated at 65 whereby the oil may escape by the abutment as well as be pushed around. However, when all the blades are in their outermost position the oil cannot escape by the abutment and, consequently, a full braking action will be secured through the reaction of the various parts including the oil. Where the brake is only half full of oil the lower part of the brake mechanism will function to secure a braking action so that the abutments 34 and 35 will alternately act. Where the brake mechanism is applied to all four wheels of the automobile, it will be seen that there is ample braking action without straining any of the parts to quickly bring the wheels to a stop without any appreciable jar.

In Fig. 11 a slightly modified structure is shown which is formed exactly as shown in the preferred form except that the tubular extension 9 of hub 7 has been dispensed with. The enlargement 3 is extended radially inward and formed as an integral part of the auxiliary stationary hub 16. This eliminates the use of the packing 21 and associated parts and also eliminates the bar 17 and associated parts. In addition, it permits the oil from the brake to freely enter the wheel hub 7. As a matter of fact, the action of the pump provides a circulation of oil so that the bearings of the wheel are maintained lubricated. In this form of the invention there is provided a cap 66 which prevents the escape of oil, while the cap 8 acts to keep the oil in place as shown in Fig. 3.

I claim:

1. A hydraulic brake for vehicle having wheels, comprising a stationary element adapted to be connected to a stationary part of the vehicle, a rotating element arranged exteriorly of the stationary element and adapted to be connected with one of said wheels, means coacting with said elements to form a pair of oil chambers, radially movable members carried by said stationary element, spring means for causing said radially movable members to move radially outwardly into said oil chambers, a spring for each of said radially movable members for moving the same inwardly radially, and a rock-shaft actuated mechanism for limiting and preventing said spring from functioning.

2. A hydraulic brake for a vehicle wheel, comprising a casing adapted to be connected with said wheel, a stationary element concentrically arranged within said casing, a rotatable drum concentrically arranged within said casing and rigidly secured thereto, said drum having an interiorly-extending abutment, means coacting with said casing and said drum for forming an oil chamber, a plurality of radially movable blades carried by said stationary element and adapted to move into sliding engagement with the interior surface of said drum so as to force oil in said chamber against said abutment when said wheel is rotated, a spring for moving said blades radially outwardly, a second spring for moving said blades radially inwardly, means for moving the second spring to an inoperative position, and a rock-shaft for moving said means to functioning and non-functioning position.

3. A hydraulic brake for a wheel, comprising a casing adapted to be connected to said wheel, a drum rigidly secured to said casing interiorly thereof, said drum having a plurality of chambers, each of said chambers having an abutment projecting therein, said chambers being circular except for the part occupied by said abutments, a stationary piston arranged within said drum, a plurality of radially movable blades carried by said piston, spring means for normally holding said blades within the piston, springs for moving said blades radially outwardly so as to engage the inner periphery of said drum, a control ring for controlling the action of said spring means, and a rock-shaft actuated means for moving said control ring so that said spring means may be released from functioning to permit said spring means to move said blades outwardly, said drum being provided with a supply of oil so that as said abutments pass said blades the oil will be brought under pressure and thereby produce a resistance to the rotation of said wheel, said resistance being proportionate to the outward position occupied by said blades.

4. A hydraulic brake for a wheel comprising a casing rigidly connected to said wheel, a drum connected rigidly to said casing interiorly thereof, said drum being adapted to be provided with a supply of oil, a concentrically positioned piston arranged within said drum, a plurality of radially movable blades carried by said piston, spring means for moving said blades radially inwardly, and maintaining the same nested within the piston, a spring for each blade tending to move the same radially outwardly, and a rock-shaft actuated means for releasing the means which holds the blades in their inner or nested position.

5. A hydraulic brake for a wheel, comprising a casing rigidly secured to said wheel, a drum arranged within the casing and rigidly secured thereto, said drum being provided with a pair of chambers and an abutment extending inwardly into each chamber, a stationary piston positioned within said drum so that with said drum said chambers will be substantially annular with the respective abutments restricting the chambers at diametrically opposite sides, a plurality of radially movable blades carried by said piston, a spring for moving each blade radially outwardly, a stronger spring for each blade for moving the same radially inwardly, a control ring provided with a cam for each blade, said cams acting to move said stronger springs outwardly whereby the first-mentioned springs are allowed to function, a rack mounted on said control ring, a segmental gear meshing with said rack, said gear having an arm extending therefrom, and a rock shaft secured to said arm whereby whenever said rock shaft is moved said control ring will be moved to cause the respective cams thereon to function to a greater or less extent whereby said blades may move outwardly to a greater or less extent and cause a greater or less braking action according to the respective positions of the cams.

6. In a hydraulic brake of the character described, a stationary piston having a plurality of radially movable blades, a spring for moving each blade radially outwardly, a stronger spring for each blade for moving the same radially inwardly, a block loosely connected to each of the stronger springs, a control ring having a cam for each block, and manually actuated means for moving said control ring so as to cause said cams to function to a greater or less extent for moving said stronger springs to a nonfunctioning position.

CHARLES E. FISHER.